United States Patent [19]

Friedman

[11] Patent Number: 4,785,563
[45] Date of Patent: Nov. 22, 1988

[54] ANIMAL TAG MICROFICHE INDENTIFICATION SYSTEM

[76] Inventor: Otto Friedman, 55 Charles St., Apt. 1301, Toronto, Ontario, Canada, M4S 2W9

[21] Appl. No.: 77,793

[22] Filed: Jul. 27, 1987

[51] Int. Cl.$^4$ .............................................. G09F 3/00
[52] U.S. Cl. .............................................................. 40/301
[58] Field of Search ........................... 40/300, 301, 302; 119/156; 24/16 PB; 63/12

[56] References Cited

U.S. PATENT DOCUMENTS

| | | | |
|---|---|---|---|
| 3,748,696 | 7/1973 | Martin | 40/302 |
| 4,093,288 | 6/1978 | Suzuki | 24/16 PB |
| 4,317,262 | 3/1982 | Wells, Jr. | 24/16 PB |
| 4,359,015 | 11/1982 | Ritchey | 40/301 |
| 4,441,233 | 4/1984 | Swift | 40/301 |
| 4,471,546 | 9/1984 | Bolling, Jr. | 40/300 |
| 4,506,630 | 3/1985 | Hair | 40/301 |
| 4,535,557 | 8/1985 | Porcher | 40/300 |
| 4,581,834 | 8/1986 | Zatkos et al. | 40/300 |
| 4,612,877 | 9/1986 | Hayes et al. | 119/156 |
| 4,691,458 | 9/1987 | Scott | 40/300 |
| 4,694,781 | 9/1987 | Howe et al. | 40/301 |

FOREIGN PATENT DOCUMENTS

| | | | |
|---|---|---|---|
| 0219186 | 4/1987 | European Pat. Off. | 40/300 |
| 2335014 | 7/1977 | France | 40/301 |
| 8102068 | 11/1982 | Netherlands | 40/301 |

*Primary Examiner*—John J. Wilson
*Assistant Examiner*—Michael Lynch
*Attorney, Agent, or Firm*—Bell, Seltzer, Park & Gibson

[57] ABSTRACT

A miniaturized animal identification tag is provided for securement to a pierced earlobe of an animal. The tag comprises an inert body portion having a sealed capsule with integral depending stud portion. The body portion is of insignificant size compared to the animal's ear size. The stud is fixed in place on the animal's ear after insertion through the pierced lobe. The sealed capsule contains a miniaturized information moisture sensitive medium having animal identification indicia thereon peculiar to the animal. The medium, as stored in the sealed capsule, is protected from moisture and other environmental elements. The identification medium may be plastic microfiche where the identification indicia on the microfiche is only discernable by optical magnification.

8 Claims, 2 Drawing Sheets

ANIMAL TAG MICROFICHE INDENTIFICATION SYSTEM

FIELD OF THE INVENTION

This invention relates to animal tag identification systems which may have particular application in the identification of pets.

BACKGROUND OF THE INVENTION

It is desirable in a variety of situations to identify animals either as a group or individually. This may be accomplished by such techniques as branding or tattooing which provides a permanent identification for the animal throughout its life. However, such techniques are not always suitable because they are time consuming. In animal husbandry, ear tags have been employed for many years to identify individual animals by coded number. An example of this technique is disclosed in U.S. Pat. No. 4,612,877. An ear tag is pierced through the animal's ear and permanently retained on the ear to display on the front face thereof a numerical code specifically identifying the particular animal. Another system for animal husbandry record keeping is disclosed in U.S. Pat. No. 3,952,438. The system employs the use of numerically encoded tags inserted into the flesh of the animal hind. The tag may be read by magnetic or optical scanning devices. This system expedites reading of the tag. However, it necessitates the use of a central computer system loaded with all the necessary information.

Another approach to computerized record keeping for animal tags is disclosed in U.S. Pat. No. 4,535,557. The tag may be mounted on the ear. The tag has both a numerical identification of the animal identity as well as an electronic integrated circuit with permanent memory. The permanent electronic memory may be read by a suitable electronic reading device to determine the information stored in the memory. This information is then interpreted by an electronic apparatus which displays in visual readable form the stored information. The stored information may, for example, include age, origin, breed, veterinary antecedents, medicines administered, food diet and the like. The advantage of the electronic storage system is to provide a significantly increased storage capacity for information.

Another form of animal tag identification is disclosed in U.S. Pat. No. 4,471,546. An identification tag includes a needle projecting therefrom. The needle is used to puncture the animal's ear. With the needle now extending through the animal's ear, the exposed portion is engaged by locking device to secure the identification tag on the animal's ear. The necessary identification information is engraved on the plate of the identification tag. As with the other systems which involve applying visually recognizable indicia on the physical device, there is a significant limitation on the amount of information which may be carried. In addition, thought has to be given to the sanitary conditions of the needle before it is used to puncture the animal's ear. Infection could set in rendering the tag identification system useless.

SUMMARY OF THE INVENTION

According to an aspect of this invention, a miniature animal identification tag for securement to a pierced earlobe of an animal is provided. The tag comprises an inert body portion having a sealed capsule with integral depending stud portion. The body portion is of insignificant size compared to an animal's ear size. Means is provided for sliding along the stud after the stud is inserted through the pierced earlobe of an animal. The sliding means has means for cooperating with the stud and securing the sliding means at one of a plurality of positions along the stud. The sealed capsule has a container portion and a removable lid portion for the container. The lid has means for securing the lid to the container and means for sealing the lid on the container to preclude thereby moisture entering the container. A miniaturized information moisture sensitive medium having animal identification indicia thereon peculiar to the animal is stored in the sealed capsule. The identification indicia is only discernable by optical magnification.

According to a preferred aspect of the invention, the miniaturized information medium is a microfiche chip having an image thereon defining the indicia.

According to another preferred aspect of the invention, the animal identification tag may be formed from an inert plastic.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
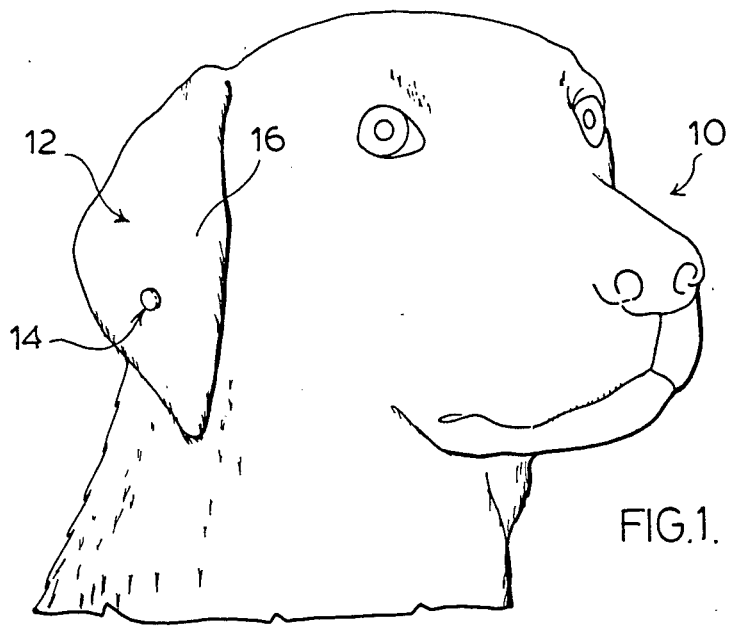
FIG. 1 is a perspective view of an aminal having the identification tag according to this invention secured to the animal's ear.

It is understood that the animal tag identification system of this invention may be used to identify a variety of animals. For purposes of describing preferred embodiments of the invention, reference will be made to the identification of pets and in particular, a dog of the type shown in FIG. 1. The dog 10 has a floppy type of ear 12 where the tag identification system 14 of this invention is secured to the lobe portion 16 of the ear. From the view of FIG. 1, it is apparent that the identification tag 14 is considerably smaller in size than the overall size of the animal's ear. Hence the tag does not detract significantly from the animal's overall appearance; yet it is visible so that the pet owner may from time to time check and make sure that the tag is in place, or for those needing to identify the animal, can plainly see that this type of tag has been provided.

In comparison to the prior art types of tag identification, the system, according to this invention, is simple to install and assemble yet provide a secure arrangement for the lifetime of the animal where considerable information may be stored in the tag.

Figure 2:
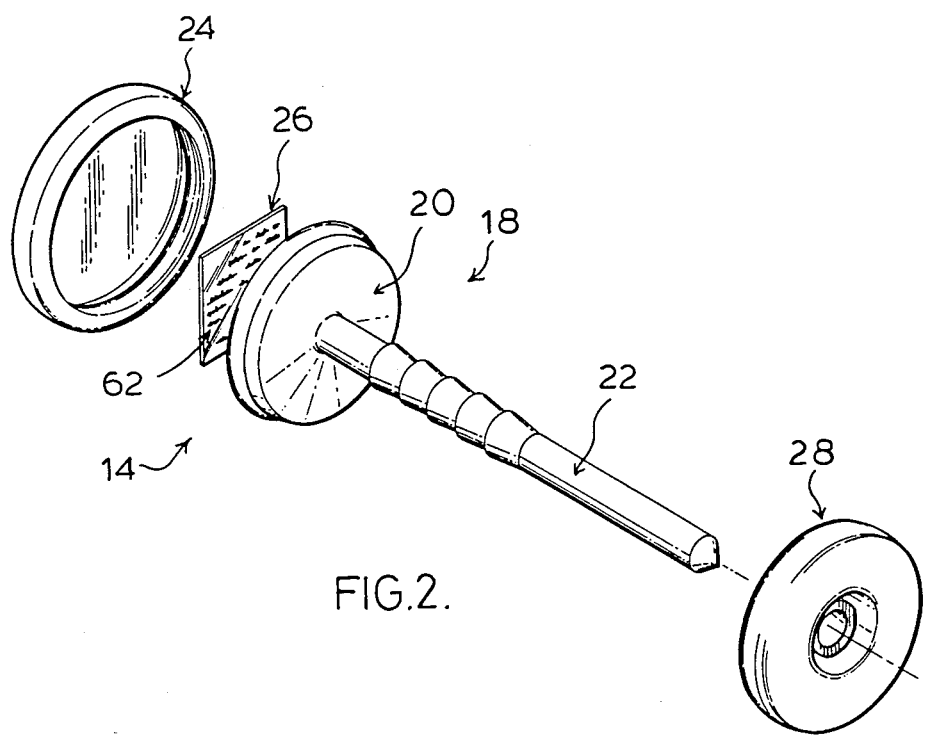
FIG. 2 is an exploded enlarged perspective view of the animal tag identification system according to an aspect of this invention.

According to the preferred embodiment shown in FIG. 2, the tag identification system 14 comprises a body portion 18 made up of a container 20 with integral depending stud 22. A lid 24 is provided for the container 20 to sealingly engage same to define a sealed capsule. Within that capsule is placed a microfiche chip of film 26 in which the information is stored in the form of an image which can only be read with the aid of magnification. To secure the body portion on the animal's ear, a stud engaging device 28 is provided to lock at various positions along the stud 22 in sandwiching the ear between the continer 20 and the engaging device 28 in a manner to be discussed with respect to FIGS. 4 and 5.

The material used in constructing the identification tag 14 must be inert and non-toxic to the animals on which it is used. It is appreciated that various types of inert metals may be employed such as a durable coating of silver on the base metal of the identification tag body portion. However, due to the miniature size of the tag, relatively expensive techniques would be required to produce such an item from metal. It is therefore preferred to mold the product from a suitable inert plastic such as polyethylene or polypropylene. The body portion 18, the lid 24 and the engaging device 28 may be all molded from this type of plastic. The inherent flexibility of the plastic in its thinner portions provides then for a snap fitting of the lid 24 of the container 20 and a suitable snap engaging of the device 28 with the stud 22. Such design of FIG. 2 readily lends itself to a molding operation and does not require complex molds to manufacture the product.

Figure 3:
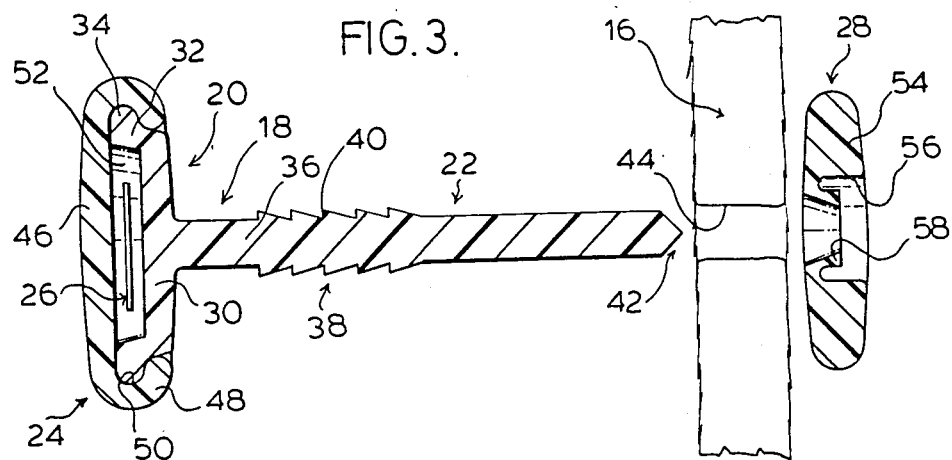
FIG. 3 is a section through the enlarged view of the tag of FIG. 2 about to be mounted on an animal's ear.

With reference to FIG. 3, the body portion 18 is molded to provide a cylindrical-shaped container 20 having a base portion 30 with side wall 32 and annular lip 34. Integral with the base 30 is the stud 22 having a shaft portion 36. Intermediate the length of the shaft a plurality of annular serrated portions are provided. A plurality of circular ridges 40 are spaced along this portion to provide a plurality of stop positions in assembling the engaging device 28 to the stud 22. The forward portion of the stud 22 is tapered at 42 to facilitate insertion of the stud through the opening 44 defined in the pierced earlobe 16 of the pet's ear. The piercing of the earlobe may be accomplished by a variety of techniques. The preferred method is to pierce the earlobe of the animal to be identified and immediately insert the stud portion of the tag through the formed opening. The tag is sterilized prior to insertion of the stud portion through the pierced earlobe to minimize any chance of infection. The engaging device 28 is placed on the stud to complete the permanent attachment of the identification tag to the ear. Alternatively and when required due to special circumstances, the pierced portion is allowed to heal in the usual manner before insertion of the stud 22. Such insertion of the stud may be done by the veterinarian or the pet owner after the healing has taken place. Another procedure involves the use of the stud portion of the tag as the implement which pierces the ear and hence is attached to the ear once piercing is completed. For example, the stud may be formed of a rigid plastic such as hard medical grade polyurethane. The sterilized tag with stud portion and engaging device may be loaded in a hand operated gun. The earlobe is placed between the stud portion and the engaging device. By manual use of the gun, the hard pointed stud pierces the earlobe and is driven into the engaging device to set the tag in place. In some situations, the hardened plastic may not be suitable for such direct piercing operations. It is appreciated that a metal stud portion may be used as made from surgical grade stainless steel or the plastic stud may be metal cladded.

The lid 24 for the container is designed to mate with the annular ridge portion 34. The lid comprises a top 46 with undercut annular ledge portion 48. By virtue of making the lid from a flexible plastic, the annular ledge portion 48 may be flexed outwardly for snap fitting over the ridge 34. The inside surface 58 of the undercut ledge is smoothly rounded to mate with the rounded surface 34 of the container to provide a sealed capsule having an interior space 52.

The microfiche chip 26, which is moisture sensitive, may then be safely stored within the sealed capsule space 52. It is appreciated that the capsule space 52 may be kept to a minimum size to either snugly receive the microfiche 26 or provide some movable space therein, such as to the extent shown in FIG. 3.

Figure 4:
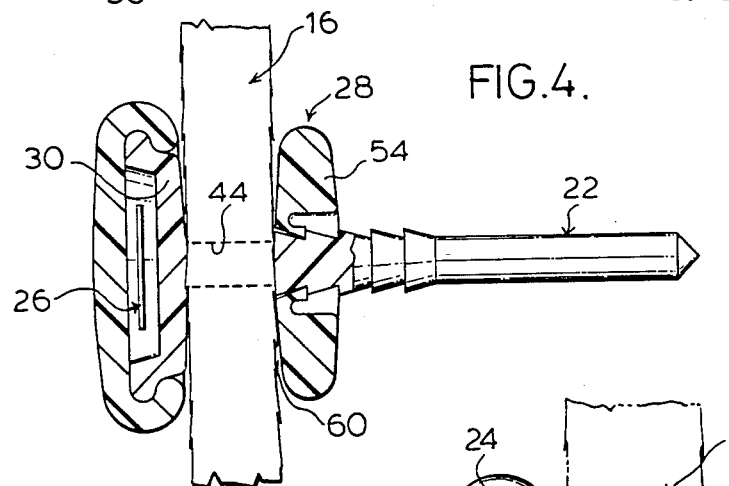
FIG. 4 is an assembled section on an animal's ear of the tag of FIG. 2.
Figure 5:
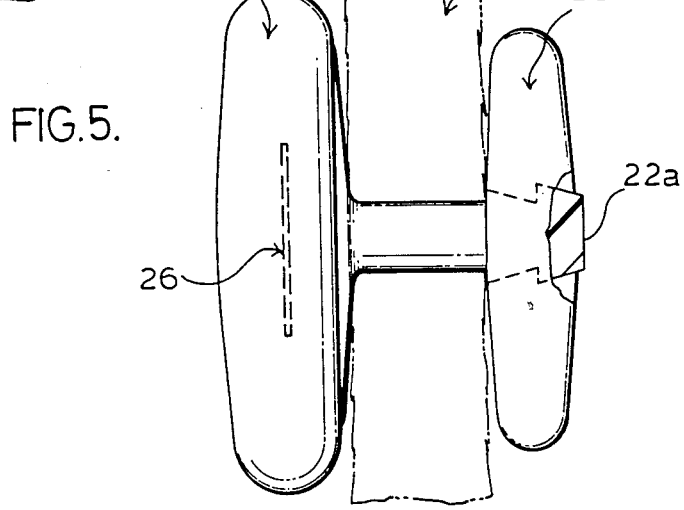
FIG. 5 is a side enlarged view of the assembled tag of FIG. 4 in its final arrangement.

The engaging device 28 has an annulus portion 54 with a central bore 56. Within that bore are a plurality of inwardly projecting fins 58. The fins of plastic are sufficiently flexible to snap over the ridge 40 of the serrated portion 38. As shown in FIG. 4, the engaging device 28 is then slid up the stud 22 after the stud has been inserted through the pierced earlobe 16. Depending upon the thickness of the animal's ear, the engaging device 28 is pushed up the serrated portion until the earlobe 16 is sandwiched comfortably between the base 30 of the container 20 and the face 60 of the annulus portion of the engaging device.

It is appreciated that the animal's earlobe does not increase sufficiently in size during the growth phase. With very young animals, it may be necessary, however, to leave some space to accommodate slight increases in thickness of the lobe during the growth phase. For more mature animals, the system may be placed in the manner shown in FIG. 5 where the lobe is comfortably received between the base of the container and the engaging device. With the tag in position, the extraneous portion of the stud 22 may be removed leaving a blunt end 22a. As shown in the enlarged view, the engaging device 28 has smoothly rounded surfaces. Correspondingly, the lid 24 also has smoothly rounded surfaces. This reduces or virtually eliminates the tag becoming caught on various objects to minimize the risk of the tag being torn from the animal's ear. Due to the inert nature of the body portion of the tag, the animal may wear it for its entire life. The necessary identification information is contained on the microfiche chip 26. As shown in FIG. 2, the image on the microfiche chip contains considerable information as indicated by the dots 62. As is appreciated, on a very small portion of a microfiche film considerable accurate information may be contained. For example, the dog's name, date of birth, owner's name and address, veterinarian, telephone numbers, pet's medical history, pet's pedigree and special medication or diet may easily be included on the chip. The preferred size for the microfiche chip is in the range of 3 to 5 mm square. The indicia 62 may be read by any suitable optical magnification device, such as a handheld magnifier or a suitable microfiche reader. Whenever there is a need to identify the animal, the identification tag 14 may be simply removed from the animal's ear by cutting the plastic stud portion 22. This releases the container. The lid 24 can then be removed from the container to extract the microfiche chip therefrom. By reading the information on the microfiche, the animal can be readily identified. It is appreciated that should any of the information need to be updated, it is simply a matter of having a new microfiche chip prepared with the new indicia thereon. The owner may then either remove the lid from the container and replace the chip and reseal the capsule, or if necessary, cut the stud portion 22 and replace the tag with a new tag containing the new information. Due to the miniature size of the tag, it is sufficiently light so as to not weigh down the animal's ear thereby causing discomfort which might encourage the animal to scratch and cause damage to the ear in which the tag is placed.

The tag identification system, according to this invention, is therefore readily manufactured and simple to secure permanently on the animal. The system provides the manner in which all the necessary information to properly identify the animal without having to resort to any central database or the like to further identify the animal by way of numerical code. People who are familiar with this system may readily extract the information from the microfiche chip by use of a simple magnifying glass. No sophisticated equipment nor complex training of personnel is required to extract the necessary information from the system. Actually, those who are familiar with the system can readily extract the information, read it and return the pet to the owner. This avoids costly time consuming resort to a central database clearing station. Due to the simple manner of installing the system on the animal's ear, no elaborate surgical procedure is required. Hence there is minimal chance of rejection by the animal. It is not necessary to implant the system under the animal's skin which can result in subsequent complications or require removal should the information have to be updated.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A miniature identification tag for securement to a pierced ear of an animal, said tag comprising an inert body portion having a sealed capsule with integral depending stud portion, said body portion being of insignificant size compared to an animal's ear size, means for engaging said stud after said stud is inserted through a pierced ear lobe of an animal to secure thereby said tag on an animal's ear, said engaging means having means for cooperating with said stud and securing said engaging means at one of a plurality of positions along said stud to sandwich an animal's ear between said engaging means and said capsule, said sealed capsule having a container portion and a removable lid portion for said container, said lid having means for securing said lid to said container and means for sealing said lid on said container to preclude thereby moisture entering said container, a miniaturized information moisture sensitive medium having animal identification indicia thereon peculiar to such animal, said medium being stored in said sealed capsule, said identification indicia only being discernable by optical magnification.

2. An identification tag of claim 1, wherein said miniaturized information medium is a microfiche chip having an image defining said indicia.

3. An identification tag of claim 2, wherein said container is circular and of a dimension to receive in a confined space said microfiche chip.

4. An identification tag of claim 3, wherein said sealed capsule is circular and has a diameter in the range of 5 to 10 mm.

5. An identification tag of claim 3, wherein said lid has an annular inturned ledge for engaging an annular ridge of said container to seal said container, said lid being of a plastic material which is sufficiently flexible to permit snap fitting of said annular inturned ledge of said lid over said annular ridge of said container to provide said sealed capsule.

6. An identification tag of claim 5, wherein said stud has a serrated portion, said securing means comprising inwardly biased resilient fins for engaging said serrated portion to define said plurality of positions along said studs.

7. An identification tag of claim 6, wherein said plastic is polypropylene.

8. An identification tag of claim 2, wherein said body portion is of an inert plastic.

* * * * *